G. G. B. TARTARA.
PHOTOGRAPHIC AND CINEMATOGRAPHIC APPARATUS.
APPLICATION FILED JULY 1, 1918.

1,295,081.

Patented Feb. 18, 1919
2 SHEETS—SHEET 1.

Inventor:
Giuseppe G. B. Tartara
By Luis Rainely ke
Attorney.

G. G. B. TARTARA.
PHOTOGRAPHIC AND CINEMATOGRAPHIC APPARATUS.
APPLICATION FILED JULY 1, 1918.
1,295,081.
Patented Feb. 18, 1919.
2 SHEETS—SHEET 2.
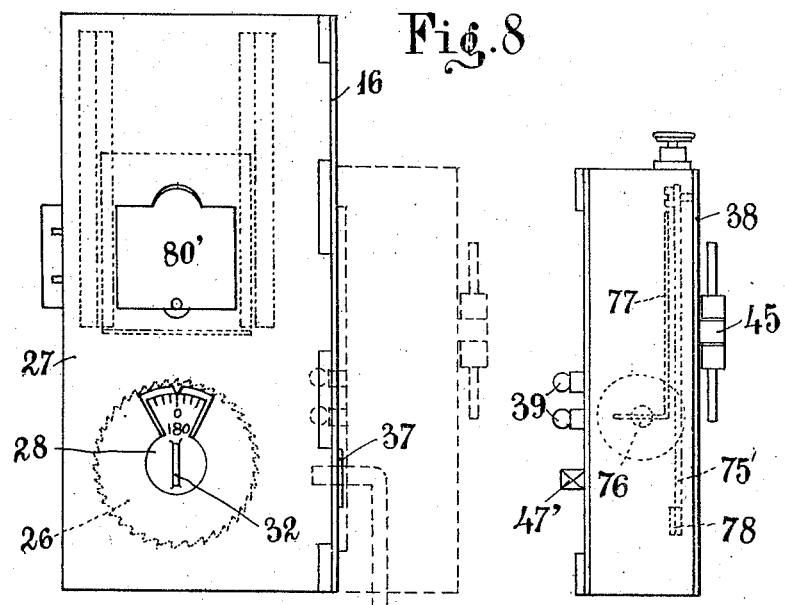
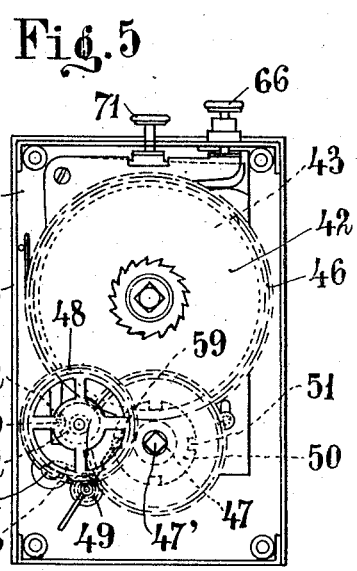
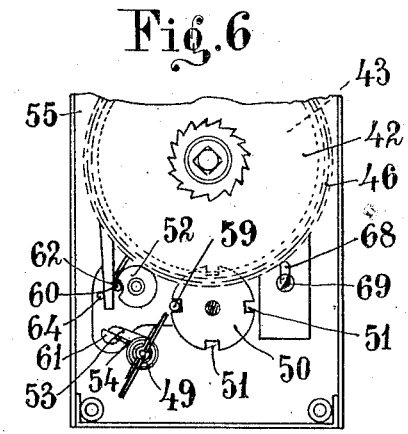

UNITED STATES PATENT OFFICE.

GIUSEPPE GIOVANNI BATTISTA TARTARA, OF TURIN, ITALY.

PHOTOGRAPHIC AND CINEMATOGRAPHIC APPARATUS.

1,295,081.  Specification of Letters Patent.  Patented Feb. 18, 1919.

Application filed July 1, 1918. Serial No. 242,943.

*To all whom it may concern:*

Be it known that I, GIUSEPPE GIOVANNI BATTISTA TARTARA, subject of the King of Italy, residing at Turin, Italy, have invented certain new and useful Improvements in Photographic and Cinematographic Apparatus, of which the following is a specification.

This invention has for its object a photographic and cinematographic apparatus of very reduced size allowing of taking at will ordinary photographs as well as motion pictures, said apparatus being operated manually or automatically by a clockwork. The apparatus according to the invention is also provided with a brake for regulating the speed of the shutter and the feeding of the film, and further comprises a counter showing the number of photograms produced. This apparatus may be utilized directly for the printing of positive cinematograph films.

In the annexed drawings:

Fig. 5 shows the driving mechanism;

Fig. 6 is a view similar to Fig. 5, but with the front wheels of the gearing taken off for clearness;

Fig. 8 is a rear end view of the camera showing in dotted lines the driving means coupled with it, and Fig. 9 is an external side view of the driving apparatus.

Figure 1:
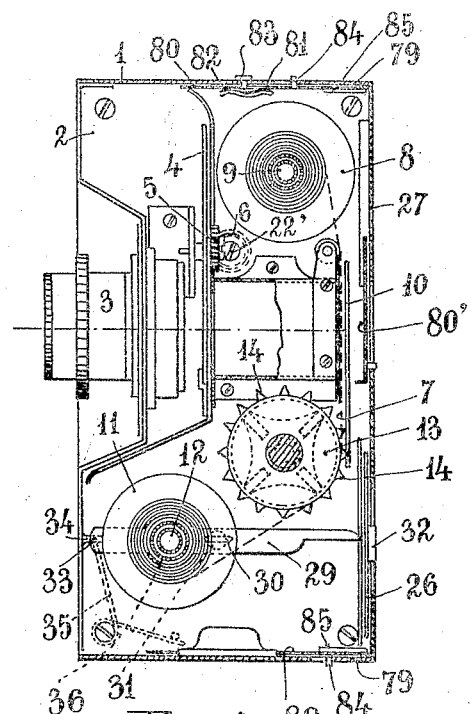
Figure 1 is a transverse sectional view of the improved camera taken in the plane of the objective axis.

The apparatus comprises a box or case of any suitable shape which is divided into two compartments by a partition 2.

In one of said compartments is arranged the objective 3, of any ordinary type, provided with a rotary shutter 4 suitably operated through the agency of pinions 5 and 6, by the driving mechanism.

The film 7 wound on the spool 8 carried by a shaft 9, is guided through the pressure frame 10 in front of the objective and is rolled upon the spool 11 mounted on the shaft 12 driven also by the feeding mechanism. The intermittent feeding of the film is effected by a drum 13 fitted with teeth 14 designed to engage the perforations of the film band and according to this invention said drum is integral with the Maltese cross 19, this rigid connection insuring the regular feeding of the film, the play of the gears being eliminated.

Figure 2:
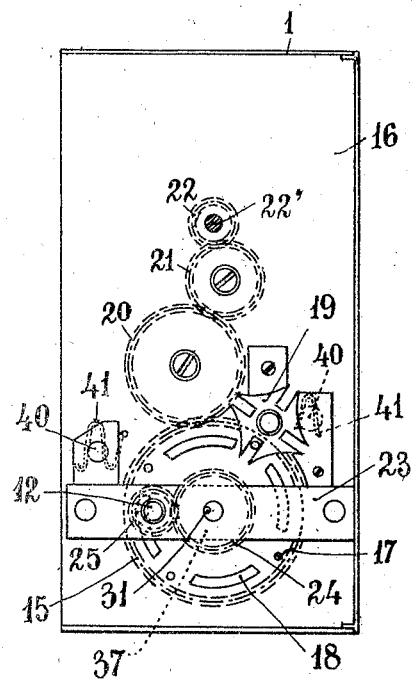
Fig. 2 is a transverse section of the camera taken through the compartment inclosing the Maltese cross and the gearing operating the film spools.
Figure 7:
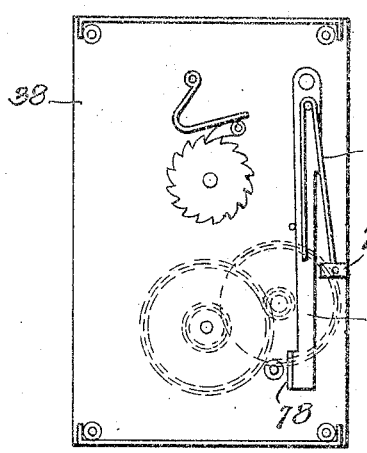
Fig. 7 is an inner view of the back wall of the case inclosing the driving mechanism.
Figures 3, 4:
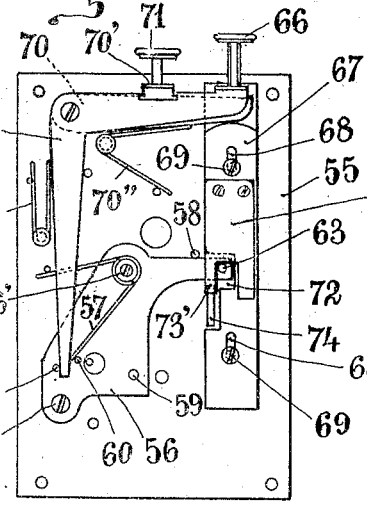
Fig. 3 is an inner view of the front wall of the case inclosing the driving mechanism.
Fig. 4 is a side view of the same.

The members above described are operated by the driving mechanism mounted in the second compartment and shown in Fig. 2, such mechanism comprising a toothed wheel 15 whose shaft is journaled in the back wall 16 of the case 1 and in the cross bar 23. Said wheel carries pins 17 and segments 18 coöperating with the Maltese cross 19 integral with the axle of the drum 13, and, by means of the gearing 20, 21, 22, drives the shaft 22' carrying the pinion 6. Upon the axle of the wheel 15 is mounted a pinion 24 meshing with the pinion 25 keyed on the shaft 12 carrying the spool 11.

In order to make known to the operator the number of exposures taken and the number still left, the apparatus is provided with a counter comprising a ratchet wheel 26 (Figs. 1 and 8), journaled in the wall 27 of the case 1, which wall is hinged to the wall 16, said wheel being provided with a graduation visible from the outside through an opening 28.

The wheel 26 is controlled by an oscillating lever 29 having a slot 30 engaged by a pin 31 eccentrically secured to the front end of the shaft of the wheel 15, so that at each revolution of said wheel the lever 29 makes an oscillation and causes the wheel 26 to advance to the extent of a tooth. The wheel 26 may be brought back to zero by acting on the button 32.

In order to prevent the lever 29 from engaging the ratchet wheel 26 while the hinged wall 27 is being closed, the said lever is equipped with a pin or projection 33, which extends into a guide slot 34 formed in the partition wall 2 and is engaged by a spring 35, whereby it is normally held in retracted position and automatically returned to such position after having been actuated by the eccentric pin 31. The lever 29 is finally provided with an elongated hole 36 providing passage for the shaft 12.

The apparatus may be operated manually by a handle engaging the hub 37 of the wheel 15 as indicated in dotted lines in Fig. 8 or by a clockwork hereinafter described which allows of taking a single photograph as well as a cinematograph scene, or of printing positive films, said driving mechanism controlling in each case the shutter and the film feeding in such a manner that at each operation an unexposed zone of the film is placed in front of the objective.

The driving mechanism, shown in Figs. 3—7 and 9, is inclosed in a box adapted to be coupled with the camera by means of pins 39 which are held in holes 40 of the wall 16, for instance, by spring stirrups 41 (Fig. 2). In the opposite walls 38 and 55 of the box is journaled the drum 42 including a spring motor 43 which may be wound up by means of a key 45 and provided with a toothed rim 46 meshing with the wheel 47, the axle of which latter projects beyond the box wall 38 and is intended to engage with its quadrangular end 47', the hub 37 of the wheel 15. The wheel 47 drives the wheel 48 and the fly-wheel or governor 49; and on the axle of the said wheel 47 is keyed a disk 50 provided with four notches 51, the axle of the wheel 48 carrying a disk 52 of reduced size provided with a single notch 62. Finally on the axle of the fly-wheel 49 an arm 53 is mounted, said arm being connected with the axle 49 by a spring 54, so that it may rotate to a little extent on said axle.

The wall 55 (Figs. 3 and 4) carries the device for controlling the driving mechanism. Said device comprises an angle lever 56 pivoted at 56' on the wall 55 and normally held by the spring 57 against a stop member 58. The said lever carries pins 59, 60 and 61 which in the inoperative position engage respectively one of the notches 51, the notch 62 and the arm 53. The lever 56 carries also a pin 63 and a pin 64 by means of which it is placed under the control of the lever 65, which in turn may be operated from outside by the button 66. Upon the wall 55 is slidably mounted, by means of slots 68 and screw pins 69, a vertical bar 67 bearing against a lever 70 which is pivoted behind the lever 65 and may be controlled from outside by means of the button 71 coöperating with a projection 70' on the lever 70. In front of said tooth or projection 70' there is a notch in the adjacent lever 65, so that the lever 70 may oscillate freely. The middle portion of the sliding bar 67 is formed with an opening 72 into which projects the arm of the lever 56 carrying the pin 63. The bar 67 carries a flat spring 73 which initially engages the pin 63 when the lever 70, and consequently the bar 67, is lowered, but releases it after a portion of its stroke; an extension 73' of the spring 73 engaging a cam surface 74 being forced outward, thus leaving the pin 63 free.

The operation of the apparatus is the following:

When the spring drum 42—43 is wound up and the driving mechanism has been coupled with the camera, with the quadrangular end of the shaft 47' engaged in the hub 37, the operator has only to push down the button 66. The lever 65 oscillates, thus causing the pins 59, 60 and 61 of the lever 56 to disengage the corresponding notches 51 and 52 and the arm 53; in consequence whereof the driving mechanism is released and begins to turn operating the wheel 15 and the Maltese cross to advance the film. A moving picture may then be taken, the feeding continuing as long as the button 66 is pushed down, while the fly-wheel 49 regulates the rotation of the rotating members. When the button 66 is released, the levers 65 and 66 are brought back in their normal positions by the springs 75 and 57, and the pins of the lever 56 engage again the corresponding members, thus stopping the action of the apparatus.

When a single photograph is to be taken, the button 71 controlling the lever 70 must be brought completely down.

By this operation the bar 67 is lowered and, acting on the pin 63, it causes the lever 56 to oscillate; said lever however being immediately brought back to its normal position by the spring 57 as soon as the spring 73 is raised by the extension 73' engaging the cam surface 74, while the lever 70 is returned to its normal position by the spring 70''. Consequently the pin 59 which had moved out of one of the notches 51 of the disk 50 keyed on the wheel 47, thus allowing the rotation of the latter, bears again on the periphery of the disk 50 and locks the same as soon as it registers with the following notch 51, so that the mechanism is stopped. The described operation is not hindered by the pins 60 and 61, the same being carried by the same lever 56 carrying the pin 59, and therefore being displaced with the latter.

In order to prevent the pin 59 from falling back again into the same notch, due to the quickness of the movement of the lever 56 and to the relatively low speed of rotation of the disk 50, and thus hindering the action of the driving mechanism, the notch 62 in the disk 52 is made large and its bottom caused to merge gradually into the peripheral surface of the disk. Said disk is keyed on the axle of the wheel 48 which revolves at a much higher speed than the wheel 47, so that, as soon as the mechanism is free from the locking device, said disk advances immediately and brings under the pin 60 its peripheral surface. In this way the lever 56 is kept from being restored prematurely to its locking position.

The wheels 48 and 15 thus make a fourth of a revolution and are automatically stopped so that the feeding mechanism causes the film to advance to the extent of a single exposure and the shutter makes a single revolution; a single photograph is taken and the apparatus is ready for a new operation.

The arm 53 must be yieldingly mounted, as described, upon the axle of the fly-wheel 49 which revolves at high speed, as in this way the shock against the locking pin 61 is reduced and any damage of the mechanism is prevented.

For controlling the speed of the fly-wheel 49 and consequently of the whole apparatus, a lever 75' is provided which is pivoted on the wall 38 and operated by a button 76 through a spring 77, the lever 75' carrying a member 78, for instance of india rubber, which is pressed with the desired force against the axle of the wheel 49.

In using the apparatus, a spool 8, carrying the roll-film, is mounted on the shaft 9, the film is passed through the pressure frame 10 and its end clamped on the spool 11 after having engaged the teeth 14 of the drum 13 in the perforations of the film. The counter is then brought to zero and the apparatus is closed and ready for use.

The motion may be imparted by an ordinary handle or by the described driving mechanism which can be employed in taking moving pictures, by holding the button 66 lowered, as well as in taking ordinary photographs by pressing down the button 71; the time of exposure may be adjusted at will by means of the brake controlled by the button 76.

When the apparatus is to be used for printing positive films, the objective is first shut and the film to be printed is arranged in the above described manner, the negative film being put in through the openings 79 of the upper and lower walls of the casing, and with the perforations engaging the teeth 14 of the drum 13. The port 80' in the back wall 27 of the apparatus is then opened and the driving mechanism put in operation, the same causing the advancement of both films and the rolling up of the exposed positive on the spool 11; the time of exposure may also be adjusted by means of the braking device 75', 76, 77 and 78.

The openings 79 are normally closed by plates 80 slidably mounted on the walls of the case 1 by means of guides 81 and pressed against the same by springs 82 which are compressed by screws 83; the said plates may be operated from outside by means of buttons 84 and at their ends are provided with a rib 85 intended to bear close against the wall 27 in order to prevent the penetration of light.

What I claim and desire to secure by United States Letters Patent is:

1. In photographic and cinematographic apparatus, the combination, with means for supporting, exposing and feeding the film step by step, and a motor for driving the feeding mechanism; of a disk driven by said motor; locking means on the periphery of said disk; an oscillating member engaging said locking means; a pivoted lever operated from outside for controlling said oscillating member to bring it out of such engagement; and a sliding member operated from outside and acting on the said oscillating member to disengage it momentarily.

2. In photographic and cinematographic apparatus, the combination, with means for supporting, exposing and feeding the film step by step, and a motor for driving the feeding mechanism; of a disk driven by said motor; locking means on the periphery of said disk; an oscillating member engaging said locking means; a pivoted lever operated from outside for controlling said oscillating member to bring it out of such engagement; a sliding member operated from outside and acting on the said oscillating member to disengage it momentarily; and means for holding the oscillating member out of engagement as soon as disengaged.

3. In photographic and cinematographic apparatus, the combination, with means for supporting, exposing and feeding the film step by step, and a motor for driving the feeding mechanism; of a disk driven by said motor; locking means on the periphery of said disk; an oscillating member engaging said locking means; means operated from outside for controlling said oscillating member to bring it out of engagement; a sliding member operated from outside; means on said sliding member engaging the oscillating member, said means being disengaged at the end of the stroke of the sliding member to release the oscillating member; and means for holding said oscillating member out of such engagement as soon as disengaged.

4. In photographic and cinematographic apparatus, the combination, with means for supporting, exposing and feeding the film step by step, and a motor for driving the feeding mechanism; of a disk driven by said motor; locking means on the periphery of said disk; an oscillating member engaging said locking means; a pivoted lever controlling said oscillating member to bring it out of such engagement; means for operating said lever from outside; a sliding member for controlling the oscillating member to disengage it momentarily; means for operating said sliding member from outside; and a second disk driven by the motor, said second disk revolving at a higher speed than the first-named disk and coöperating with the oscillating member to hold the same in unlocking position as soon as disengaged.

5. In photographic and cinematographic apparatus, the combination, with means for supporting, exposing and feeding the film step by step, and a motor for driving the feeding mechanism; of members driven by said motor and provided with locking means; an oscillating member carrying locking means, a portion of which coöperates with the motor-driven locking members; a fly-wheel driven by the motor; an arm yieldingly mounted on the axle of said fly-wheel; locking means on the oscillating member adapted to engage said arm; and means for controlling the said oscillating member from outside to disengage the motor.

In testimony whereof I have affixed my signature.

GIUSEPPE GIOVANNI BATTISTA TARTARA.

Copies of this patent may be obtained for five cents each, by addressing the "Commissioner of Patents, Washington, D. C."